United States Patent Office 3,482,018
Patented Dec. 2, 1969

3,482,018
DERMATOLOGICAL COMPOSITION CONTAINING FLUOROMETHOLONE
Ladislaus D. A. Szabo and Birgit Yrsa Keimer, Copenhagen, Denmark, assignors to The Upjohn Company, Kalamazoo, Mich., a corporation of Delaware
No Drawing. Continuation-in-part of application Ser. No. 413,977, Nov. 25, 1964. This application Sept. 7, 1966, Ser. No. 577,598
Int. Cl. A61k 7/00, 17/00, 27/00
U.S. Cl. 424—181                    5 Claims

ABSTRACT OF THE DISCLOSURE

Topical dermatological composition and process of treating dermatosis, including Prurigo Besnier and psoriasis with fluorometholone (21-desoxy-9α-fluoro-6α-methylprednisolone) dissolved in a solvent of 1,3-butanediol or 2,3-butanediol.

CROSS-REFERENCE TO RELATED APPLICATIONS

This application is a continuation-in-part of application Ser. No. 413,977, filed Nov. 25, 1964, now U.S. Patent No. 3,342,676.

The present invention relates to a novel steroid composition for topical application and a method of treating skin diseases.

There has for some years been a constant search for new corticosteroids being as effective as hydrocortisone, but not having the side effects of this well-known steroid. Some years ago, as a result of this search, the compound 21-desoxy-9α-fluoro-6α-methylprednisolone (in the following named by the generic name "fluorometholone") appeared as a topically applicable steroid having marked anti-inflammatory activity. Although fluorometholone contains a 9α-fluoro-configuration, its administration does not result in sodium and water retention typical of 9α-fluorohydrocortisone. Clinical evaluation in humans demonstrated this observation originally made in animal studies. Doses were given orally and intravenously to determine the effect of fluorometholone on electrolyte and nitrogen metabolism. With oral doses of 2–10 mg. per day, there was no evidence of any effect on electrolyte regulation or of any increased nitrogen excretion. Further studies were conducted with 14 mg. of fluorometholone given by i.v. drip over an 8-hour period. Even at this intravenous dosage level, little or no effect was seen on electrolyte or nitrogen balance.

The topical evaluation of fluorometholone as an anti-inflammatory agent demonstrated that it was an extremely potent steroid when applied topically. When effects of oral administration in man were subsequently evaluated, the anti-inflammatory activity was found to be only 1–3 times greater than that of hydrocortisone given by mouth. However, when applied topically in human studies, fluorometholone was shown to have an activity 40 times greater than that of hydrocortisone. This inherent security aganist systemic side effects is considered of definite advantage in the treatment of chronic diseases of the skin and/or those affecting large areas. Classic examples are Prurigo Besnier, a chronic and recurrent disease and psoriasis, a chronic disease in the eruptive phase requiring penetrating anti-inflammatory steroid treatment.

Fluorometholone has been marketed as a topical anti-inflammatory steroid incorporated in a vehicle consisting essentially of glycerol monostearate, spermaceti, polyethylene glycol, and purified water. Also an ointment containing fluorometholone and neomycin has been marketed. The vehicle includes liquid petrolatum, cholesterol, microcrystalline wax and white petrolatum.

These fluorometholone preparations, however, seem to fall short of what might be expected in respect to clinical efficacy when treating certain skin disorders, especially in the so-called occlusive treatment of psoriasis. This is rather surprising taking into consideration the very high topical anti-inflammatory activity of fluorometholone.

Working from the concept that the somewhat disappointing results might be due to the fact that the penetration of fluorometholone into the skin was unsatisfactory, we carried out a number of experiments with varying vehicles. Quite surprisingly it was found that some vehicles showed outstanding effects in comparative vasoconstriction tests as compared with commonly used solvents such as polyethylene glycol and glycerol.

The steroid compositions of the present invention comprise a solution of fluorometholone in a solvent selected from the group consisting of 1,3-butanediol, and 2,3-butanediol. In a preferred composition additional ingredients such as a fatty substance; a suitable preservative such as methylparaben, butyl-p-hydroxybenzoate, or the like; and a topical antibacterial or antifungal agent such as neomycin polymyxin, salicylic acid, cetylpyridinium chloride and the like. The steroid is preferably present in a concentration of about 0.01% to about 0.125%, all percentages here and hereinafter being expressed as percentages by weight. Lower or higher concentrations may well be used, the upper range, however, being limited by the solubility of fluorometholone in the particular vehicle.

The characteristics of the solvents 1,3-butanediol and 2,3-butanediol are that they have low toxicity, low order of skin irritation, chemical structure showing both hydrophilic and lipophilic groups, miscibility with water, ability to dissolve fluorometholone. The solvent concentrations may vary from about 75 parts by weight to just below 100% as in case of pure solutions of fluorometholone. Mixtures of these solvents may very well be used and fall within the scope of the invention. While 1,3-butanediol has been used previously in pharmaceutical preparations, neither of the solvents have been suggested in connection with anti-inflammatory steroids.

As fatty substances according to the present invention may be used wool alcohol, wool fat, almond oil, cholesterol, octyldodecanol, or the like. They are according to a preferred form of the invention used in an amount of from about zero to about 25 parts by weight. They are included in the compositions mostly to avoid drying and peeling of the skin as is frequently observed in psoriasis.

The following examples will illustrate compositions in accordance with the present invention, the scope of the invention not, however, being limited to the specific details of these examples.

Example 1

|  | Parts |
|---|---|
| Fluorometholone | 0.01 |
| 2,3-butanediol | 99.99 |

Example 2

| Fluorometholone | 0.125 |
|---|---|
| 2,3-butanediol | 99.875 |

Example 3

| Fluorometholone | 0.05 |
|---|---|
| 2,3-butanediol | 99.95 |

Example 4

| Fluorometholone | 0.01 |
|---|---|
| 1,3-butanediol | 99.99 |

Example 5

| | |
|---|---|
| Fluorometholone | 0.10 |
| 1,3-butanediol | 99.90 |

Example 6

| | |
|---|---|
| Fluorometholone | 0.05 |
| 1,3-butanediol | 99.95 |

Example 7

| | |
|---|---|
| Fluorometholone | .05 |
| Octyldodecanol | 10.00 |
| 2,3-butanediol | 89.95 |

Example 8

| | |
|---|---|
| Fluorometholone | .05 |
| Polypropyleneglycol 2000 | 10.00 |
| 2,3-butanediol | 89.95 |

Example 9

| | |
|---|---|
| Fluorometholone | 0.05 |
| Wool alcohol | 5.00 |
| 2,3-butanediol | 94.95 |

Example 10

| | |
|---|---|
| Fluorometholone | 0.125 |
| Wool alcohol | 25.00 |
| 2,3-butanediol | 74.875 |

Example 11

| | |
|---|---|
| Fluorometholone | 0.05 |
| Wool alcohol | 5.00 |
| 1,3-butanediol | 94.95 |

Example 12

| | |
|---|---|
| Fluorometholone | 0.05 |
| Wool alcohol | 10.00 |
| 1,3-butanediol | 89.95 |

Example 13

| | |
|---|---|
| Fluorometholone | 0.1 |
| Wool alcohol | 10.0 |
| 1,3-butanediol | 44.9 |
| 2,3-butanediol | 45.0 |

Example 14

In each of the preceding Examples 1 through 13, inclusive, each of the following additional ingredients can be added in the range of amount shown (with a corresponding decrease in the amount of 1,3-butanediol or 2,3-butanediol): neomycin sulfate, 0.25 part to 1 part; salicylic acid, up to 1 part; carboxypolymethylene, 0.05 part to 5 parts; cetylpyridinium chloride, 0.01 part to 1 part.

It is a further object of the present invention to provide a method of treating skin diseases which comprises the step of topically applying a sufficient amount of fluorometholone in a vehicle comprising 1,3-butanediol or 2,3-butanediol, possibly with a fatty substance included. Fluorometholone is preferably present in the vehicle in a concentration of from 0.01 to 0.125 part by weight.

What is claimed is:

1. A steroid composition for dermatological use, which comprises from about 0.01 to about 0.125 part by weight of 21-desoxy-9α-fluoro-6α-methylprednisolone and from about 99.875 to about 99.999 parts by weight of a member selected from the group consisting of 1,3-butanediol and 2,3-butanediol.

2. A steroid composition for dermatological use comprising from about 0.01 to about 0.125 part by weight of 21-desoxy-9α-fluoro-6α-methylprednisolone, from about 75 to about 99.99 parts by weight of a member selected from the group consisting of 1,3-butanediol and 2,3-butanediol and from about 0 to about 25 parts by weight of a fatty substance selected from the group consisting of wool alcohol, wool fat, almond oil, cholesterol and octyldodecanol.

3. The composition of claim 1 wherein said member is 2,3-butanediol.

4. The composition of claim 1 containing up to 1 part by weight of neomycin.

5. A method of treating dermatosis comprising the topical application of an effective amount of a steroid composition comprising from about 0.01 to about 0.125 part by weight of 21-desoxy-9α-fluoro-6α-methylprednisolone and from about 99.875 to about 99.99 parts by weight of a member selected from the group consisting of 1,3-butanediol and 2,3-butanediol.

References Cited

UNITED STATES PATENTS

| | | | |
|---|---|---|---|
| 2,978,379 | 4/1961 | Shell | 424—243 |
| 3,342,676 | 9/1967 | Szabo et al. | 424—78 |

ALBERT T. MEYERS, Primary Examiner

D. R. MAHANAND, Assistant Examiner

U.S. Cl. X.R.
424—230, 238, 330